United States Patent
Garcia-Herreros et al.

(10) Patent No.: US 10,931,188 B2
(45) Date of Patent: Feb. 23, 2021

(54) IRONLESS LINEAR MOTOR WITH PARALLEL YOKES SEPARATED BY A SPACER WITH UNINTERRUPTED BORE SECURED WITH A SLEEVE AND A SCREW IN THE SLEEVE

(71) Applicant: ETEL S.A., Môtiers (CH)

(72) Inventors: Iván Garcia-Herreros, St. Sulpice (CH); Jean-Pierre Morel, Les Fourgs (FR)

(73) Assignee: ETEL S.A., Môtiers (CH)

( * ) Notice: Subject to any disclaimer, the term of this patent is extended or adjusted under 35 U.S.C. 154(b) by 67 days.

(21) Appl. No.: 16/407,301

(22) Filed: May 9, 2019

(65) Prior Publication Data
US 2019/0348897 A1    Nov. 14, 2019

(30) Foreign Application Priority Data

May 9, 2018   (EP) ..................... 18171383

(51) Int. Cl.
*H02K 41/03*   (2006.01)
*H02K 3/47*    (2006.01)

(52) U.S. Cl.
CPC ............. *H02K 41/031* (2013.01); *H02K 3/47* (2013.01)

(58) Field of Classification Search
CPC .......... H02K 41/031; H02K 3/46; H02K 3/47; H02K 41/02; H02K 41/03; H02K 41/033
USPC ................. 301/12.04–12.24, 15–25
See application file for complete search history.

(56) References Cited

U.S. PATENT DOCUMENTS

| | | | | |
|---|---|---|---|---|
| 5,565,718 A | * | 10/1996 | Takei | ............... H02K 41/031 310/12.02 |
| 5,648,691 A | * | 7/1997 | Takei | ............... H02K 41/031 310/12.01 |
| 6,140,734 A | * | 10/2000 | Hazelton | ................ H02K 3/04 310/12.21 |
| 6,787,943 B2 | * | 9/2004 | Godkin | .............. H01F 7/066 310/12.16 |

(Continued)

FOREIGN PATENT DOCUMENTS

| | | |
|---|---|---|
| EP | 17196215.2 | 4/2019 |
| JP | 2005-237087 | 9/2005 |

(Continued)

OTHER PUBLICATIONS

AMPG Catalogue: Sex Bolts & Mating Fasteners, p. 1-6; Jan. 1, 2014.

*Primary Examiner* — Maged M Almawri
(74) *Attorney, Agent, or Firm* — Carter DeLuca & Farrell LLP

(57) ABSTRACT

A secondary part of an ironless linear motor includes a spacer and two yoke plates, which are arranged in parallel to each other and carry magnets having an alternating polarity. The yoke plates are maintained at a defined distance by the spacer. The spacer has at least two uninterrupted bore holes. Sleeves having a first screw head and an internal thread are inserted through one of the yoke plates and through a respective uninterrupted bore hole, the first screw heads securing the yoke plate in place on the spacer. A screw, having a second screw head, is screwed through the other yoke plate into each sleeve so that the second screw heads secure the other yoke plate in place on the spacer.

16 Claims, 2 Drawing Sheets

(56) References Cited

U.S. PATENT DOCUMENTS

| | | | |
|---|---|---|---|
| 7,663,270 B2* | 2/2010 | Sadakane | H02K 41/031 310/12.29 |
| 7,936,096 B2* | 5/2011 | Shikayama | H02K 41/03 310/12.29 |
| 8,541,911 B2* | 9/2013 | Evers | H01F 7/066 310/12.04 |
| 8,847,443 B2* | 9/2014 | Makino | H02K 41/033 310/12.02 |
| 9,148,047 B2* | 9/2015 | Hsu | H02K 3/04 |
| 9,647,511 B2* | 5/2017 | Morel | H02K 9/22 |
| 10,199,913 B2* | 2/2019 | Kollen | B23K 31/02 |
| 10,581,309 B2* | 3/2020 | Da Conceicao Rosa | H02K 41/0356 |
| 2003/0137199 A1* | 7/2003 | Morel | H02K 41/031 310/12.01 |
| 2006/0175907 A1 | 8/2006 | Shikayama et al. | |
| 2010/0109449 A1* | 5/2010 | Hoppe | H02K 41/02 310/12.33 |
| 2012/0187309 A1* | 7/2012 | Krechting | B82Y 10/00 250/453.11 |
| 2017/0373579 A1* | 12/2017 | Goncalves | H02K 9/22 |
| 2019/0115817 A1 | 4/2019 | Monaghan et al. | |

FOREIGN PATENT DOCUMENTS

| | | | |
|---|---|---|---|
| JP | 2006-304438 A | | 11/2006 |
| WO | WO20171163978 | * | 9/2017 |

* cited by examiner

IRONLESS LINEAR MOTOR WITH PARALLEL YOKES SEPARATED BY A SPACER WITH UNINTERRUPTED BORE SECURED WITH A SLEEVE AND A SCREW IN THE SLEEVE

CROSS-REFERENCE TO RELATED APPLICATIONS

The present application claims priority to Application No. 18171383.5, filed in the European Patent Office on May 9, 2018, which is expressly incorporated herein in its entirety by reference thereto.

FIELD OF THE INVENTION

The present invention relates to a secondary part for a linear motor, to a secondary part for an ironless linear motor, and to an ironless linear motor.

BACKGROUND INFORMATION

An example of an ironless linear motor is described in U.S. Patent Application Publication No. 2006/0175907. In addition, European Published Patent Application No. 3 471 245 (and counterpart U.S. Patent Application Publication No. 2019/0115817) describes aspects of an ironless linear motor, in particular, a secondary part for an ironless linear motor. Linear motors are often used when a highly precise and possibly also rapid positioning of objects is involved, such as in the case of a linear axle of a machine tool. The primary part of the linear motor may be directly connected via a suitable interface to the machine component to be moved or to some other object. In other words, in contrast to a conventional rotary motor, there is no need for a transmission that is connected between the linear motor and the object to be driven.

For applications that require particularly precise positioning, so-called ironless linear motors in which no iron core is allocated to the coils of the primary part are particularly suitable. Interfering latching forces are avoidable in this manner.

As described in European Published Patent Application No. 3 471 245, two yoke plates, which are located across from each other and carry permanent magnets of an alternating polarity, are connected to a spacer for the installation of a secondary part. Toward this end, the spacer has uninterrupted bore holes including an internal thread, so that the yoke plates are able to be connected to the spacer from both sides with the aid of screws. In addition, uninterrupted bore holes are found in the spacer and corresponding recesses through which the secondary part is able to be fastened to a machine part are provided in the yoke plates. The production and assembly of the components of the secondary part or their mounting on a machine part therefore involves a certain degree of effort.

SUMMARY

Example embodiments of the present invention provide a secondary part of an ironless linear motor in which this effort is reduced.

According to an example embodiment of the present invention, a secondary part of an ironless linear motor includes a spacer and two yoke plates, which are located parallel to each other and carry magnets of alternating polarity. The first yoke plate and the second yoke plate are maintained at a defined distance by the spacer. The spacer has at least two through holes. Inserted through the first yoke plate and through the through holes are sleeves having a first screw head and an internal thread in each case, the first screw heads securing the first yoke plate in place on the spacer. Screws having a second screw head in each case are screwed into the sleeves through the second yoke plate so that the second screw heads secure the second yoke plate in place on the spacer.

The sleeves and the first screw heads may have a shared through hole that includes an internal thread.

The secondary part may be attached to a machine part by a mounting screw screwed into the through hole of each sleeve.

At least one of the first yoke plate and the second yoke plate may include a countersunk through hole, through which the sleeve and/or the screw is arranged.

The first screw head and/or the second screw head may be tapered in correspondence to the countersunk through hole.

A magnetization direction of each magnet on the first yoke may be the same as a magnetization direction of each opposing magnet on the second yoke.

A magnetization direction of each magnet on each of the first yoke and the second yoke is opposite to each adjacent magnet.

According to an example embodiment of the present invention, an ironless linear motor includes a secondary part, as described herein.

A primary part movable between in a space between the first yoke and the second yoke.

Further features and aspects of example embodiments of the present invention are described in more detail below with reference to the appended Figures.

DETAILED DESCRIPTION

Figure 1:
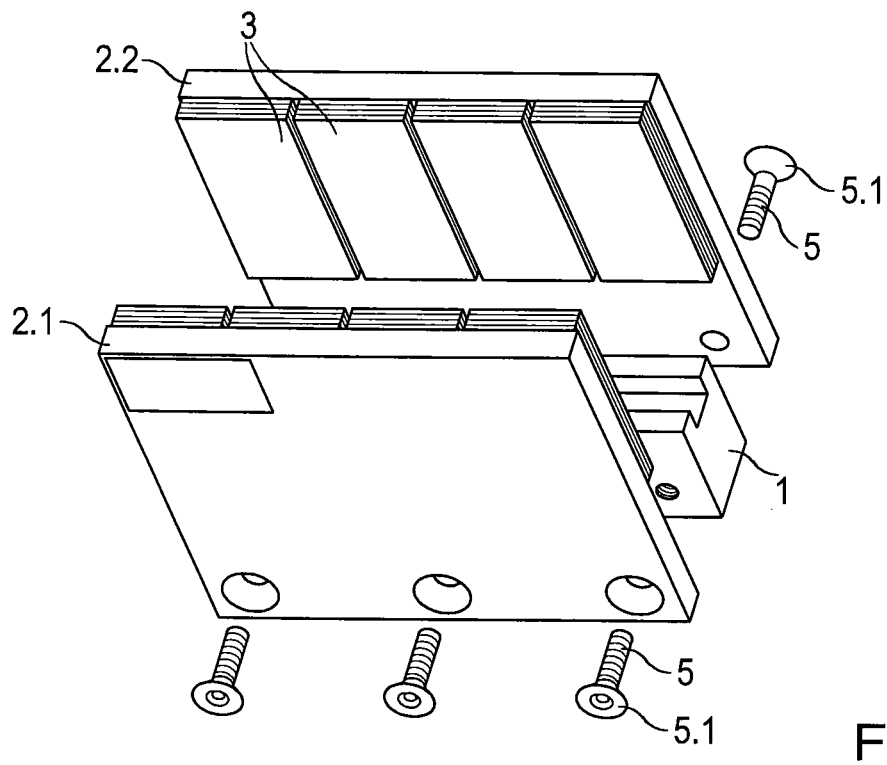
FIG. 1 is a perspective view of a conventional secondary part.

FIG. 1 is a perspective view of a conventional secondary part. A first yoke plate 2.1 and a second yoke plate 2.2 are connected to a spacer 1 such that the two yoke plates 2.1, 2.2 are arranged parallel to and opposite each other. Yoke plates 2.1, 2.2 carry magnets 3 of alternating polarity, with the polarity of adjacently located magnets 3 alternating in the same manner that the polarity of the respective opposite poles of magnets 3 facing each other alternates. The direction of the magnetization of magnets 3 arranged opposite each other is the same in each case, and the direction of the magnetization of adjacently positioned magnets 3 is rotated by 180 degrees.

Yoke plates 2.1, 2.2 form a U-shaped profile in cross-section together with spacer 1, in which the primary part of the ironless linear motor is able to move between magnets 3. The primary part and the secondary part are fastened to different components of a machine that are meant to move relative to one another. Acting between these elements is a linear guide, which thus also guides the primary part relative to the secondary part.

Yoke plates 2.1, 2.2 are fastened to spacer 1 with the aid of screws 5. Screws 5 are inserted through yoke plates 2.1, 2.2 and screwed into spacer 1, which is provided with suitable bore holes featuring an internal thread for this purpose. Screw heads 5.1 of screws 5 secure yoke plates 2.1, 2.2 on spacer 1. In the example illustrated in FIG. 1, it is therefore necessary to introduce suitable bore holes and internal threads into spacer 1 and six screws in total are screwed into the secondary part for the assembly.

Figure 2:
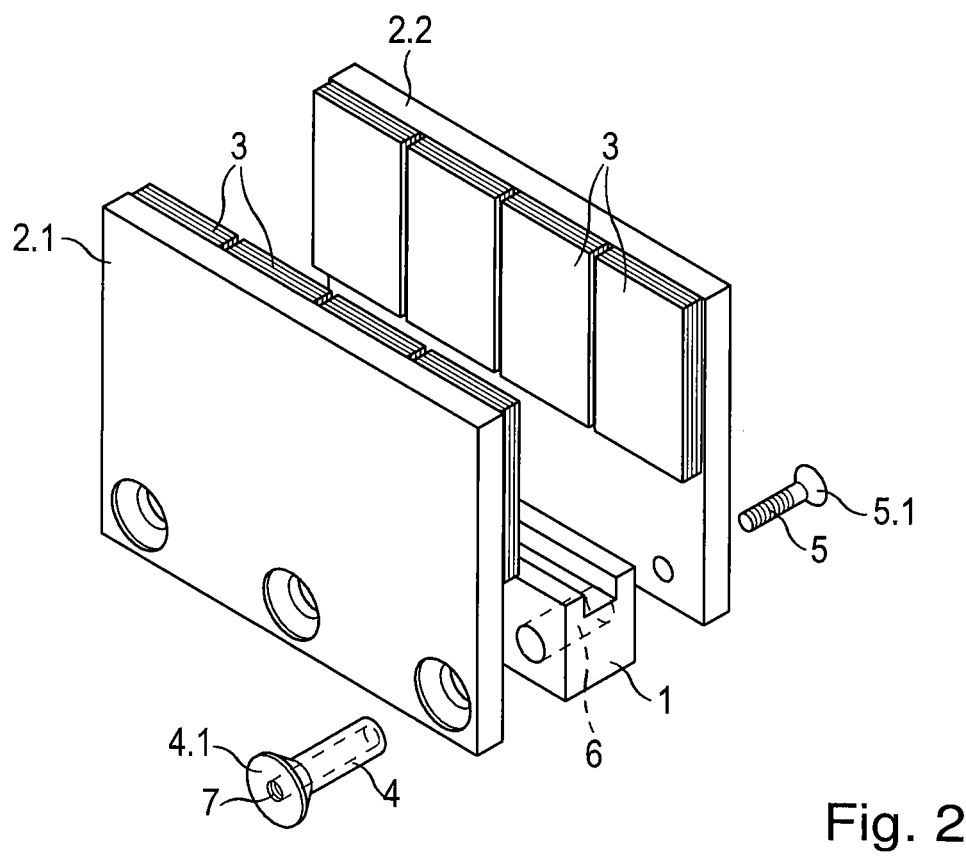
FIG. 2 is a perspective view of a secondary part according to an example embodiment of the present invention.

FIG. 2 shows a secondary part according to an exemplary embodiment of the present invention. Spacer 1 has at least two uninterrupted bore holes 6, which do not require or include a screw thread and which are therefore much easier to produce. For the assembly, what are generally referred as screw posts (or also as Chicago screws) are employed in this case, which may typically be used for binding books or in the manufacture of furniture. Such screw posts include two parts: a sleeve 4 having an internal thread and a first screw head 4.1, into which a screw 5 having a second screw head 5.1 is screwed.

As illustrated in FIG. 2, sleeves 4 are inserted into and through uninterrupted bore holes 6 so that first screw heads 4.1 secure first yoke plate 2.1 in place on spacer 1. Screws 5 are screwed through second yoke plate 2.2 and into sleeves 4, second screw heads 5.1 thereby securing second yoke plate 2.2 in place on spacer 1. In order to prevent a co-rotation of sleeve 4 when screw 5 is screwed in, an internal hexagonal profile, for example, may be provided in first screw head 4.1. Using a matching inner hexagonal key or a corresponding device on an assembly bench, it is possible to prevent a co-rotation of sleeves 4. On an assembly bench equipped with such devices, there is no need to turn the secondary part during the assembly, which means that a further working step is omitted in comparison with conventional devices. Instead of an inner hexagonal profile, it is also possible to use other screw head profiles.

In this manner, it is not only possible to dispense with the production of an internal thread in uninterrupted bore holes 6 of spacer 1, but also to halve the number of screw-fitting operations during the assembly of yoke plates 2.1, 2.2 on spacer 1.

Figure 3:
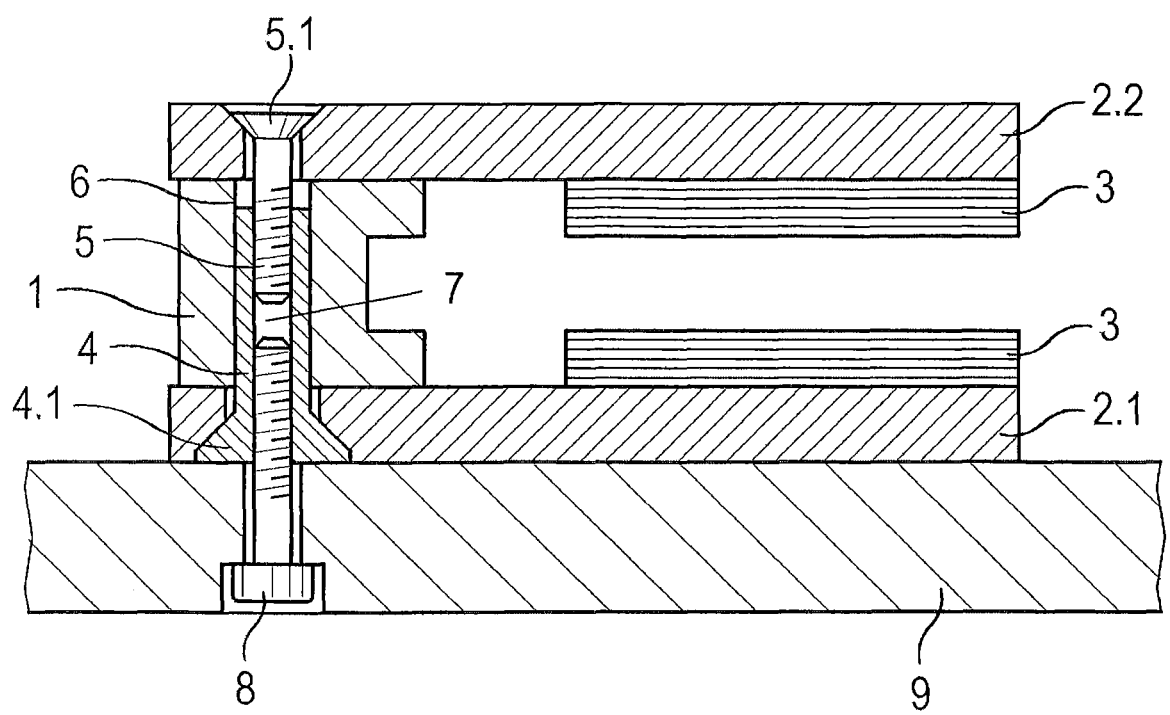
FIG. 3 is a cross-sectional view of an exemplary embodiment of a secondary part according to the present invention, mounted on a machine part.

Another example embodiment of the present invention is illustrated in FIG. 3. In this example, the secondary part with its two yoke plates 2.1, 2.2 secured in place on spacer 1 is attached to a machine part 9, and thus installed in an apparatus. Different from conventional screw posts, sleeve 4 and first screw head 4.1 have a shared through hole 7 including an internal thread. A mounting screw 8 may thus be inserted through a simple bore hole without its own thread in machine part 9 and screwed into sleeve 4. The effort required to produce the secondary part is further reduced inasmuch as no separate bore holes for the fastening to machine part 9 are required on the secondary part, and the preparation of machine part 9 is also simplified in comparison with conventional devices.

The use of a screw-lock lacquer or adhesive between sleeve 4 and screws 5 is recommended in order to prevent yoke plates 2.1, 2.2 from detaching from spacer 1 when secondary part 9 is removed from machine part 9.

Because of the use of a particular fastener device, as described herein, it is possible to reduce the effort involved in the production of such secondary parts, especially in cases in which the fastener includes an internally-threaded through hole 7.

What is claimed is:

1. A secondary part of an ironless linear motor, comprising:
   a spacer including at least two uninterrupted bore holes;
   a first yoke plate;
   a second yoke plate, the first yoke plate and the second yoke plate arranged in parallel to each other, magnets of alternating polarity being provided on the first yoke plate and on the second yoke plate, the spacer maintaining the first yoke plate and the second yoke plate at a defined distance from each other;
   at least two sleeves, each sleeve having a first screw head and an internal thread and arranged through the first yoke plate and through a respective one of the uninterrupted bore holes, the first screw head securing the first yoke plate in place on the spacer; and
   at least two screws, each screw having a second screw head and screwed through the second yoke plate into a respective one of the sleeves, the second screw head securing the second yoke plate in place on the spacer.

2. The secondary part according to claim 1, wherein a magnetization direction of each magnet on the first yoke is the same as a magnetization direction of each opposing magnet on the second yoke.

3. The secondary part according to claim 1, wherein a magnetization direction of each magnet on each of the first yoke and the second yoke is opposite to each adjacent magnet.

4. The secondary part according to claim 1, wherein the sleeves and the first screw heads have a shared through hole that includes an internal thread.

5. The secondary part according to claim 4, wherein the secondary part is attached to a machine part by a mounting screw screwed into the through hole of each respective sleeve.

6. The secondary part according to claim 1, wherein at least one of the first yoke plate and the second yoke plate includes a countersunk through hole, through which a respective sleeve and/or a respective screw is arranged.

7. The secondary part according to claim 6, wherein the first screw head and/or the second screw head is tapered in correspondence to the countersunk through hole.

8. An ironless linear motor, comprising:
   a secondary part, including:
      a spacer including at least two uninterrupted bore holes;
      a first yoke plate;
      a second yoke plate, the first yoke plate and the second yoke plate arranged in parallel to each other, magnets of alternating polarity being provided on the first yoke plate and on the second yoke plate, the spacer maintaining the first yoke plate and the second yoke plate at a defined distance from each other;
      at least two sleeves, each sleeve having a first screw head and an internal thread and arranged through the first yoke plate and through a respective one of the uninterrupted bore holes, the first screw head securing the first yoke plate in place on the spacer; and
      at least two screws, each screw having a second screw head and screwed through the second yoke plate into a respective one of the sleeves, the second screw head securing the second yoke plate in place on the spacer.

9. The ironless linear motor according to claim 8, wherein a magnetization direction of each magnet on the first yoke is the same as a magnetization direction of each opposing magnet on the second yoke.

10. The ironless linear motor according to claim 8, wherein a magnetization direction of each magnet on each of the first yoke and the second yoke is opposite to each adjacent magnet.

11. The ironless linear motor according to claim 8, further comprising a primary part movable between in a space between the first yoke and the second yoke.

12. The ironless linear motor according to claim 8, wherein the sleeves and the first screw heads have a shared through hole that includes an internal thread.

13. The ironless linear motor according to claim 12, wherein the secondary part is attached to a machine part by a mounting screw screwed into the through hole of each respective sleeve.

14. The ironless linear motor according to claim 8, wherein at least one of the first yoke plate and the second yoke plate includes a countersunk through hole, through which a respective sleeve and/or a respective screw is arranged.

15. The ironless linear motor according to claim 14, wherein the first screw head and/or the second screw head is tapered in correspondence to the countersunk through hole.

16. A secondary part of an ironless linear motor, comprising:

a spacer including at least two uninterrupted bore holes;

a first yoke plate;

a second yoke plate, the first yoke plate and the second yoke plate arranged in parallel to each other, magnets of alternating polarity being provided on the first yoke plate and on the second yoke plate, the spacer maintaining the first yoke plate and the second yoke plate at a defined distance from each other;

a sleeve, having a first screw head and an internal thread, arranged through the first yoke plate and through each respective uninterrupted bore hole, the first screw head securing the first yoke plate in place on the spacer; and a screw, having a second screw head, screwed through the second yoke plate into each respective sleeve, the second screw head securing the second yoke plate in place on the spacer.

\* \* \* \* \*